(12) United States Patent
Thompson et al.

(10) Patent No.: US 11,903,398 B2
(45) Date of Patent: Feb. 20, 2024

(54) KETTLE PROCESS FOR LOW BRIX FRUIT/VEGETABLE CONTAINING PRODUCTS

(71) Applicant: ACH Food Companies, Inc., Oakbrook Terrace, IL (US)

(72) Inventors: Phyllis Dian Thompson, River Forest, IL (US); Fulya Eren, Beecher, IL (US); Martha Cassens, Chicago, IL (US); Michael Bunczek, Aurora, IL (US)

(73) Assignee: ACH Food Companies, Inc., Oakbrook Terrace, IL (US)

( * ) Notice: Subject to any disclaimer, the term of this patent is extended or adjusted under 35 U.S.C. 154(b) by 0 days.

(21) Appl. No.: 17/333,545

(22) Filed: May 28, 2021

(65) Prior Publication Data

US 2021/0368835 A1     Dec. 2, 2021

Related U.S. Application Data

(60) Provisional application No. 63/032,854, filed on Jun. 1, 2020.

(51) Int. Cl.

| | | |
|---|---|---|
| A23L 19/00 | (2016.01) | |
| A23L 3/005 | (2006.01) | |
| A23L 3/3508 | (2006.01) | |
| A23L 3/3472 | (2006.01) | |
| A23L 29/219 | (2016.01) | |

(52) U.S. Cl.
CPC .............. *A23L 19/03* (2016.08); *A23L 3/005* (2013.01); *A23L 3/3472* (2013.01); *A23L 3/3508* (2013.01); *A23L 29/219* (2016.08)

(58) Field of Classification Search
CPC ........ A23L 19/03; A23L 29/219; A23L 3/005; A23L 3/3472; A23L 3/3508
USPC ....................................................... 426/442
See application file for complete search history.

(56) References Cited

U.S. PATENT DOCUMENTS

| | | | |
|---|---|---|---|
| 2011/0151066 A1* | 6/2011 | Messervey | ............ A23L 29/212 |
| | | | 426/103 |
| 2015/0296847 A1* | 10/2015 | James | ..................... A23L 19/05 |
| | | | 426/94 |

* cited by examiner

*Primary Examiner* — Brent T O'Hern
(74) *Attorney, Agent, or Firm* — Frost Brown Todd LLP

(57) ABSTRACT

A kettle process and product formulation protect large fragile fruit or vegetable pieces that have not been previously sweetened or sugar capped. The combination of a two-starch formulation and a controlled time and temperature kettle process are able to solve the problem of preparing a fruit or vegetable product with no sweetener added using a kettle process, providing large/whole pieces of fruit or vegetable with acceptable quality both out of the jar, can, pouch, packaging or the like and/or as a baking ingredient.

4 Claims, 1 Drawing Sheet

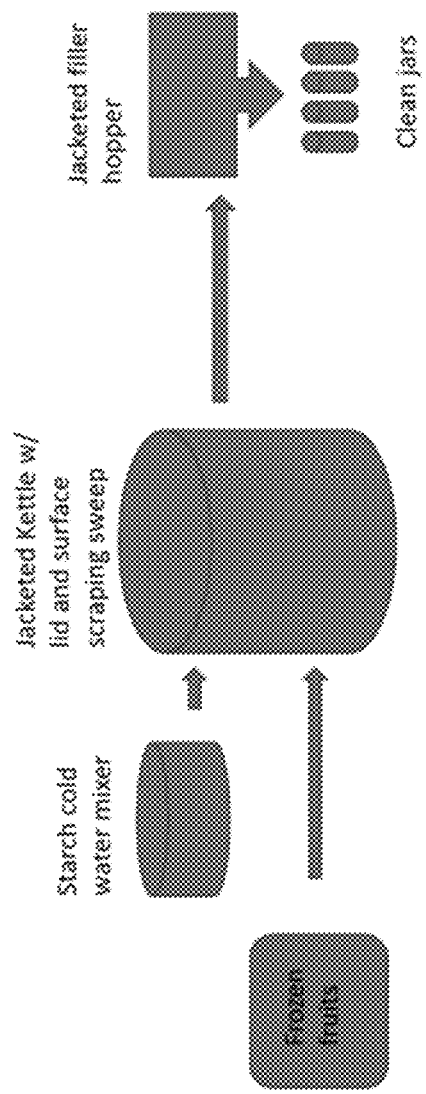

US 11,903,398 B2

KETTLE PROCESS FOR LOW BRIX FRUIT/VEGETABLE CONTAINING PRODUCTS

CLAIM OF PRIORITY

The present application claims priority to U.S. Provisional Patent Application Ser. No. 63/032,854, entitled "Kettle Process for Low Brix Fruit/Vegetable Containing Products" filed on Jun. 1, 2020, the disclosure of which is incorporated by reference herein.

FIELD OF THE INVENTION

A kettle process and product formulation protect large fragile fruit or vegetable pieces that have not been previously sweetened or sugar capped. The combination of a two-starch formulation and a controlled time and temperature kettle process are able to solve the problem of preparing a fruit or vegetable (referred to herein individually or collectively as a "fruit") product with no sweetener added using a kettle process. The invention provides large/whole pieces of fruit with acceptable quality both out of the jar, can, pouch, packaging, or the like (referred to herein individually and collectively as "jar") and/or as a baking ingredient.

BACKGROUND OF THE INVENTION

While it was known to process fruit without sweetener in a retort-in-can process, kettle processing of fruit with no sweetener added, including those without a sugar cap, presents several problems. For example, plain frozen fruit is more susceptible to breakage because it lacks the sugar cap or osmotic benefit obtained from the sweetener to stabilize the fruit cell walls. Similarly, the lack of sweetener can permit undesirable water loss from the fruit. In addition, it can be difficult to suspend large fruit pieces during processing without the addition of a sweetener. Such sweetener can be added in any form, including but not limited to sugar, honey, corn syrup or other glucose syrup, maple syrup, and the like known in the art. Furthermore, such processing provides poor performance of the fruit as part of a pie filling, resulting in a soupy pie that does not properly set after baking.

Thus, particularly among whole fruit and large-piece fruit processors, such as manufacturers of pie filling, there was a long-felt need for a no-sweetener-added formulation usable with large fruit pieces in a kettle process.

BRIEF DESCRIPTION OF THE FIGURES

FIG. 1 is a schematic of a kettle process in accordance with an embodiment of the present invention.

DETAILED DESCRIPTION OF THE INVENTION

Embodiments of the present fruit product, and process of making the same, comprise kettle processing of a fruit, without added sweetener, in the presence of two starches, Starch Type-A that provides a higher gel or "end" viscosity and Starch Type-B that provides an "immediate" viscosity. Examples of Starch Type-A include modified sago starch; examples of Starch Type-B can include one or more of corn, modified corn, wheat, and similar starches from conventional sources known in the art. Sago starch is a starch extracted from tropical palms, including the sago palm. Conventional sources of starches are well-known, and can include corn, tapioca, arrowroot, wheat, rice, and potato starches.

In some embodiments, a starch slurry contains Starch Type-A in amounts of about 0.1-10% by weight, and Starch Type-B in amounts of about 0.1-20% by weight or in amounts of 0.5-15%, with the balance being a liquid. In addition, the ratio of Starch Type-A to Starch Type-B is 1:4, in other embodiments the ratio is 1:5.

In some embodiments, a fruit product contains Starch Type-A at 0.1-10 weight %, Starch Type-B at 0.1-20 weight %, fruits at 30-80 weight %, liquids at 30-80 weight %, salt at 0-0.5 weight %, lemon juice at 0-30 weight %, and citric acid at 0-5 weight %. In other embodiments, a fruit product contains Starch Type-A at 0.4-2.5 weight %, Starch Type-B at 2.5-5.0 weight %, fruits at 45-70 weight %, liquids at 35-60 weight %, salt at 0-0.5 weight %, lemon juice at 0-30 weight %, and citric acid at 0-5 weight %. In some embodiments, a fruit product contains Starch Type-A at 0.7-2.5 weight %, Starch Type-B at 3.5-5 weight %, fruits at 45-75 weight %, liquids at 35-50 weight %, salt at 0-0.3 weight %, lemon juice at 0-30 weight %, and citric acid at 0-3 weight %. In other embodiments, a fruit product contains Starch Type-A at 0.4-1.7 weight %, Starch Type-B at 2.5-5 weight %, fruits at 35-60 weight %, liquids at 45-60 weight %, salt at 0-0.3 weight %, lemon juice at 0-30 weight %, and citric acid at 0-3 weight %.

In other embodiments, particularly those containing a low moisture fruit, the fruit product contains Starch Type-A at 0.4-1.7 weight %, Starch Type-B at 2.5-5.0 weight %, fruits at 45-55 weight %, liquids at 45-60 weight %, salt at 0-0.5 weight %, lemon juice at 0-30 weight %, and citric acid at 0-5 weight %. In other embodiments, particularly those containing a low moisture fruit, the fruit product contains Starch Type-A at 0.4-1.7 weight %, Starch Type-B at 2.5-5.0 weight %, fruits at 40-57 weight %, liquids at 45-55 weight %, salt at 0-0.15 weight %, lemon juice at 0-30 weight %, and citric acid at 0-2 weight %.

In other embodiments, particularly those containing a high moisture fruit, the fruit product contains Starch Type-A at 0.7-2.5 weight %, Starch Type-B at 3.5-5.0 weight %, fruits at 50-70 weight %, liquids at 35-50 weight %, salt at 0-0.5 weight %, lemon juice at 0-30 weight %, and citric acid at 0-5 weight %. In other embodiments, particularly those containing a high moisture fruit, the fruit product contains Starch Type-A at 0.7-2.5 weight %, Starch Type-B at 3.5-5.0 weight %, fruits at 52-75 weight %, liquids at 35-50 weight %, salt at 0-0.15 weight %, lemon juice at 0-30 weight %, and citric acid at 0-2 weight %.

The starch composition is important in the finished fruit product. For the present invention, it is necessary to identify a starch or starches that can withstand the entire manufacturing process and produce a quality final fruit product. This means the fruit product straight from the jar exhibits satisfactory distribution and suspension of the fruit pieces, contains large intact fruit pieces, and is able to perform in a subsequent heating step, such as baking. The starch formulation must provide fruit protection and be able to withstand high shearing from prolonged exposure to high heat and to survive in a low pH system.

The fruit product containing the desired starch composition must be thin enough (i.e., have a low enough viscosity) to flow without adding more shear to the fruit throughout all the pipes of a typical kettle process, such as shown in FIG. 1, but viscous enough to suspend all the fruit pieces evenly throughout the entire process, including when depositing them into jars. It must also be able to mix well with various sweeteners and/or be eaten as-is out of the jar. This means that the fruit product needs to withstand any designed time/temperature parameters required for microbial safety. It must also perform well after additional cooking. For example, it must provide a nice pie set without being too rigid or too soupy or thin after going through another step of baking done by the consumer at home.

A combination of a modified sago starch and modified corn starch permits a good process during production and provides quality performance of the final fruit product. Modified sago starch provides less friction or shear in the fruit product during production of the fruit product, and a satisfactory final pie set after being baked by the consumer. Modified corn starch provides viscosity to the fruit product formed by the starch slurry and fruit, and maintains fruit suspension in that slurry during heating, mixing, transfer, and depositing into the jar. The specific combination of these two starches results in protection of the fruit pieces from breakage during processing, more consistent drain weight throughout the process, better cooking control, such as brix and temperature. Consistent drain weight means that the ratio between fruit pieces and sauce is consistent. In addition, if the fruit product is stored in a transparent jar, for example, the consistent suspension of the fruit pieces provides a more aesthetically pleasing presentation.

The modified corn starch provides excellent viscosity and suspension to the fruit that helps the fruit stay dispersed throughout the production, during heating in kettle, transfer in pipes, and filling, instead of sinking to the bottom or floating to the top, leaving the sauce and the fruit separated. Though this starch provides some protection to the fragile fruit pieces, too high level of this starch in the formulation can create adverse effects to the fruit and cause additional shearing by creating excessive friction between the fruit pieces and the thick starch slurry itself.

The modified sago starch has extremely low hot viscosity (it is thin like water when hot), but it sets up to a firm gel when cooled. The hot sago slurry, with its lubrication or slipperiness characteristics while hot, also protects the fruit pieces further by removing some of the friction created by the modified corn starch.

The proper combination of the two starches creates a system that protects the fragile fruits, suspends them, making it possible to have consistent fruit to sauce ratio with large pieces. In addition to that, the sago functionality of "setting" up when cooled, creates the set pie that is desired after baking.

In one embodiment of the current process, the modified sago starch and conventional starch are mixed together in cold water or other liquid to form a starch slurry. Cold water, i.e., at or below about ambient temperature, permits the better dispersion of the starch, thereby avoiding or minimizing clumps of starch (often called "fish-eyes") when mixed with hot fruit mix in the kettle. Other ingredients, such as spices, flavors, alcohol for flavor, acid and salt can be added to the starch slurry to achieve the desired flavor profile of the finished fruit product.

In one embodiment, as shown in FIG. 1, the starch slurry and fruit, either fresh or frozen, are mixed in a kettle for heating to form a fruit product. The fruit product is heated at a temperature and time sufficient to heat the starch combination enough to ensure swelling and pasting of the starch granules. In some embodiments, the fruit product is heated to a temperature of at least 175° F. for a time of at least 30 seconds. The time and temperature may be increased, for example, to ensure food safety. For example, the temperature may be 195° F. or higher. The heated fruit product may be packaged at temperatures of at least 170° F., and may be packaged at temperatures as high as 210° F.

The production equipment may be designed to reduce the shear force exerted on the fruit and to reduce the likelihood of settling or separation of fruit pieces from the fruit product. This process can be used in a batch or continuous process. Larger pipes can be installed throughout the entire production line downstream of the heating kettle. The level of the heated fruit product in the filler hopper is preferably maintained at half of the total volume or less at all times to lessen the chance of settling and separation of fruit pieces while depositing into the jars. Connection pipes and splitters are preferably more gently angled to an obtuse angle to minimize shearing to the product during transfer, removing any 90 degree or less angled pipes.

EXAMPLES

Example 1

An apple fruit product and a cherry fruit product are each prepared comprising the following ingredients (all percentages by weight of total fruit product):
Apple fruit product:
Apple 30-80%
Starch A 0.1-10%
Starch B 0.1-20%
Salt 0-0.5%
Water 30-80%
Lemon juice 0-30%
Citric acid 0-5%
Cherry fruit product
Cherry 30-80%
Starch A 0.1-10%
Starch B 0.1-20%
Cherry puree 0-75%
Salt 0-0.5%
Water 30-80%
Lemon juice 0-30%
Citric acid 0-5%

Example 2

An apple fruit product is prepared comprising the following ingredients:
45-60 wt. % apples;
45-60 wt. % water;
0.4-1.7 wt. % modified sago starch;
2.5-5 wt. % conventional starch;
0-0.1 wt. % salt;
0-30 wt. % lemon juice; and
0-1.5 wt. % citric acid.

Example 3

A cherry fruit product is prepared comprising the following ingredients:
45-65 wt. % cherries;
35-50 wt. % water;
0-75% cherry puree;
0.7-2.5 wt. % modified sago starch;
3.5-5 wt. % conventional starch;
0-0.1 wt. % salt;
0-30 wt. % lemon juice; and
0-1.5 wt. % citric acid.

Example 4

A cherry fruit product is prepared according to the process steps, and comprising the ingredients, all as set forth in Table 1 below. First, into the mixing tank, add 25% of the total water content with the starches, and mix to form starch slurry. Second, separately into the cooking kettle, add the balance of the total water content, the salt, lemon juice, citric acid, and ½ of the total fruit. Heat the mixture in the cooking kettle to a temperature of 165 F. Third, add the remaining fruit. Fourth, the mixture is heated to 195 F. After the mixture reaches 195 F, meter in the cold starch slurry. Then continue heating until the mixture reaches 195-200 F. Hold at the temperature for 5 minutes. The heated cherry fruit product is then sent to the filler hopper and filled into jars at a minimum temperature of 187 F for food safety purposes.

|  | % |
|---|---|
| Tart Cherries, whole, no preservatives | 50.0000 |
| Clearjel | 4.0000 |
| Elastigel 1000J | 1.0000 |
| Cherry Puree, sweet dark, no preservatives | 4.0000 |
| Salt | 0.0400 |
| water | 40.5700 |
| Lemon juice, single strength | 0.2500 |
| Citric Acid | 0.1400 |
| Total | 100.0000 |

TABLE 1

| Process Time-temp | Steps | Where | Criteria |
|---|---|---|---|
|  | Premix 25% total water and starches. Cold | Mixing tank | Mixer ON, Heat OFF |
|  | 75% water, salt, lemon juice, citric acid, 50% frozen cherries | Cooking Kettle | Heat ON |
|  | Add remaining frozen cherries | Cooking Kettle | at 165° F. |
|  | Meter in starch slurry | Cooking Kettle | at 195° F. |
|  | Continue heating until mixture hits 195° F.-200° F. | Cooking Kettle |  |
|  | Hold at 195° F.-200° F. | Cooking Kettle | 5 minutes |
|  | Send to filler hopper | Filler Hopper | mixer blade off, keep fill level at less than half |
|  | Fill jar | Filler Nozzle | Minimum pack temp at 187° F. If below 187° F., discard |

Example 5

An apple fruit product was prepared according to the process steps set forth in Table 1 and comprising the following ingredients (all percentages by weight of total fruit product). Clearjel™ modified corn starch and Elastigel 1000J modified sago starch are both provided by Ingredion Incorporated, Westchester, IL.

|  | % |
|---|---|
| Full slice apples-sweet, no preservatives | 53.1400% |
| Clearjel | 3.0500% |
| Elastigel 1000J | 0.7500% |
| Ground Cinnamon | 0.1900% |
| Salt | 0.0400% |
| water | 42.3500% |
| Lemon juice-single strength | 0.3400% |
| Citric acid | 0.1400% |
| Total | 100.00% |

Example 6

A cherry fruit product was prepared according to the process steps set forth in Table 1, and comprising the following ingredients (all percentages by weight of total fruit product):

Example 7

A peach fruit product was prepared according to the process steps set forth in Table 1, and comprising the following ingredients (all percentages by weight of total fruit product):

|  | |
|---|---|
| sliced peach, no preservative | 56.800% |
| Clearjel | 3.637% |
| Elastigel 1000J | 1.845% |
| Salt | 0.040% |
| water | 37.209% |
| Lemon juice-single strength | 0.349% |
| Citric acid | 0.120% |
| Sugar |  |
| Total | 100.000% |

What is claimed is:
1. A product comprising
   a. fruit pieces or vegetable pieces, and
   b. a starch slurry, where in the starch slurry comprises
      i. 0.1-10 wt. % modified sago starch;
      ii. 0.1-20 wt. % conventional starch;
      iii. the balance being liquid;
   and wherein the product, at a temperature between 187-200 degrees Fahrenheit, has a sufficiently low viscosity to be flowable during manufacturing and a sufficiently high viscosity to suspend the fruit pieces or vegetable pieces in the starch slurry during manufacturing, and wherein the product, at about ambient temperature, has a sufficiently high viscosity to suspend the fruit pieces or vegetable pieces during storage after manufacturing.

2. The product of claim 1 wherein the starch slurry comprises 0.5-15 wt. % of the conventional starch.

3. The product of claim 1 wherein a weight ratio of the modified sago starch to the conventional starch is about 1:4.

4. The product of claim 3 wherein the weight ratio is about 1:5.

* * * * *